United States Patent
Colvin

(10) Patent No.: US 6,803,354 B2
(45) Date of Patent: Oct. 12, 2004

(54) STABILIZATION OF HYDROGEN PEROXIDE IN ACIDIC BATHS FOR CLEANING METALS

(75) Inventor: Michael Colvin, Auburn, NY (US)

(73) Assignee: Henkel Kormanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 10/212,977

(22) Filed: Aug. 5, 2002

(65) Prior Publication Data

US 2004/0023827 A1 Feb. 5, 2004

(51) Int. Cl.$^7$ .......................... C11D 14/02; C11D 7/18; C23G 14/02
(52) U.S. Cl. ....................... 510/254; 510/372
(58) Field of Search ......................... 510/302

(56) References Cited

U.S. PATENT DOCUMENTS

| | | | |
|---|---|---|---|
| 2,856,275 A | 10/1958 | Otto | |
| 3,407,141 A | * 10/1968 | Banush et al. | ............. 252/79.4 |
| 3,537,895 A | 11/1970 | Lancy | |
| 3,556,883 A | 1/1971 | Naito et al. | |
| 3,649,194 A | 3/1972 | Glanville | |
| 3,801,512 A | * 4/1974 | Solenberger | ................ 252/186 |
| 4,022,703 A | 5/1977 | Bakes et al. | |
| 4,040,863 A | 8/1977 | Kitamura | |
| 4,059,678 A | 11/1977 | Winkley | |
| 4,070,442 A | 1/1978 | Watts | |
| 4,754,803 A | 7/1988 | Escobar, Jr. et al. | |
| 4,770,808 A | 9/1988 | McDonough et al. | |
| 5,211,927 A | 5/1993 | Itani et al. | |
| 5,364,549 A | 11/1994 | McDonough | |
| 5,376,387 A | 12/1994 | Monticello | |
| 5,417,775 A | 5/1995 | Peddrazzini | |
| 5,843,240 A | 12/1998 | Pedrazzini et al. | |
| 5,904,157 A | 5/1999 | Meseha et al. | |
| 5,908,511 A | 6/1999 | Bianchi | |
| 6,036,758 A | 3/2000 | Fairweather | |
| 6,126,755 A | 10/2000 | Colgan et al. | |
| 6,176,937 B1 | 1/2001 | Colgan et al. | |
| 6,348,440 B1 | 2/2002 | Meskers, Jr. et al. | |

FOREIGN PATENT DOCUMENTS

GB     2014552     9/1979

* cited by examiner

Primary Examiner—Yogendra N. Gupta
Assistant Examiner—John M Petruncio
(74) Attorney, Agent, or Firm—Stephen D. Harper; Mary K. Cameron

(57) ABSTRACT

Aqueous acidic solutions of hydrogen peroxide used for metal surface treatments may be stabilized to decrease the rate of hydrogen peroxide decomposition by the use of an aryl sulfonic acid such as phenol sulfonic acid in combination with a triazole such as tolyltriazole.

20 Claims, No Drawings

STABILIZATION OF HYDROGEN PEROXIDE IN ACIDIC BATHS FOR CLEANING METALS

BACKGROUND OF THE INVENTION

This invention pertains to metal surface treatment wherein an aqueous acidic solution of hydrogen peroxide is used. More specifically, the invention relates to the use of particular stabilizers to retard the decomposition of the hydrogen peroxide which normally is encountered when using such solutions to treat metal surfaces.

When a metal substrate is processed, a metal oxide layer often forms on the substrate surface which adversely affects the surface appearance and/or the ability to carry out further desired processing steps. It is therefore desirable to remove or at least reduce the amount of the metal oxide coating on the substrate surface. These processes are generally referred to in the field as metal pickling, metal polishing, or metal brightening, depending upon the particular type of surface treatment being used.

Solutions of hydrogen peroxide, and in particular aqueous acidic solutions of hydrogen peroxide, are commonly used in industry to clean or otherwise treat metal surfaces. However, during the course of such treatment, metal ions originating from the metal oxide layer typically accumulate in the solution. For economic reasons, it is standard practice to avoid discarding metal treatment solutions frequently, so that over time the concentration of metal in solution tends to increase. Many metals will catalyze hydrogen peroxide decomposition, especially when the solution is acidic. As the hydrogen peroxide concentration decreases, the efficacy of the treatment solution is reduced and additional hydrogen peroxide must be added to restore the treatment solution performance. If a relatively high rate of hydrogen peroxide replenishment is needed due to rapid decomposition, the economics of the metal treatment process become much less favorable.

SUMMARY OF THE INVENTION

The invention pertains to a stabilizer composition useful for stabilizing an acidic aqueous solution of hydrogen peroxide, said stabilizer composition comprising an aryl sulfonic acid or salt thereof (preferably, a hydroxy-aryl sulfonic acid or salt thereof, most preferably, phenol sulfonic acid or salt thereof) and a triazole or salt thereof (preferably, a benzotriazole or salt thereof, most preferably, tolyltriazole or salt thereof). The water-soluble salts of aryl sulfonic acids and triazoles (especially the alkali metal salts) are particularly preferred for use when the stabilizer composition is in concentrate form (i.e., before being combined with the mineral acid component of the acidic aqueous solution).

Additionally, the present invention provides a hydrogen peroxide solution stabilized against decomposition catalyzed by metal ions, said solution comprising water, hydrogen peroxide, an aryl sulfonic acid or salt thereof and a triazole or salt thereof.

The invention further pertains to a process for treating a surface of a metal substrate, said process comprising:
a) contacting said surface with an aqueous acidic solution comprised of water, hydrogen peroxide, a mineral acid, an aryl sulfonic acid, and a triazole; and
b) maintaining said surface in contact with said solution until at least a portion of said metal oxide layer has been removed from said surface.

DETAILED DESCRIPTION OF THE INVENTION

The aryl sulfonic acid and triazole are present in the aqueous acidic solution of hydrogen peroxide in amounts effective to reduce the rate of hydrogen peroxide decomposition when the solution is used to treat a metal surface as compared to the rate of hydrogen peroxide decomposition which would otherwise occur in the absence of the aryl sulfonic acid and triazole. Preferably, the weight ratio of aryl sulfonic acid:triazole in the solution is from about 0.5:1 to about 50:1.

For practical reasons, it will often be desirable to prepare a stabilizer composition in concentrated form which contains both the aryl sulfonic acid and the triazole in the ratio which will be desired in the solution used to treat a metal substrate surface. The concentrated stabilizer composition may then be conveniently combined with the hydrogen peroxide and other components of the aqueous acidic solution to form the initial working bath.

In one embodiment of the invention, the aryl sulfonic acid and triazole are combined with aqueous hydrogen peroxide to form a stabilized hydrogen peroxide composition. This stabilized hydrogen peroxide composition is later combined with the other desired components of the initial working bath (e.g., mineral acid) only shortly before the bath is used to pickle, clean, descale or brighten a metal substrate surface. The stabilized hydrogen peroxide composition typically will contain water, 35 to 60 (preferably, 45 to 55) weight percent hydrogen peroxide, 0.1 to 2 (preferably, 0.3 to 0.7) weight percent aryl sulfonic acid, and 0.005 to 0.1 (preferably, 0.01 to 0.05) weight percent triazole.

As the stabilizer components of the working bath become depleted with extended use of the working bath, additional quantities of the concentrated stabilizer composition may be added incrementally or continuously to the working bath to restore the concentrations of the stabilizer components to the desired levels. The concentrated stabilizer composition can, if desired, be added to the working bath separately from the hydrogen peroxide, but most conveniently the stabilizer composition can be introduced via a hydrogen peroxide solution (such as, for example, by way of the stabilized hydrogen peroxide compositions described in the immediately preceding paragraph).

The stabilizer compositions described herein may be employed in any of the metal surface treatment processes known in the art which utilize an acidic aqueous solution of hydrogen peroxide. The stabilizer compositions of the present invention are particularly useful for stabilizing aqueous hydrogen peroxide solutions used in the oxidative pickling of non-ferrous metal surfaces.

For example, in one preferred embodiment of the invention the stabilizer composition is used in an acidic aqueous solution of hydrogen peroxide which is contacted with the surface of a copper or copper alloy substrate. Methods of pickling, descaling or brightening copper and copper alloy surfaces using acidic aqueous solutions of hydrogen peroxide are already known in the art, as described for example in the following United States patents (each of which being incorporated herein by reference in its entirety): U.S. Pat Nos. 3,556,883; 3,537,895; 3,649,194; 3,801,512; 4,022,703; 4,040,863; 4,059,678; 4,754,803; 4,770,808; 5,211,927; 5,376,387; 5,904,157; 6,036,758; 6,126,755; and 6,176,937.

The treatment bath (i.e., aqueous acidic solution of hydrogen peroxide) prepared from the stabilizer composition preferably is free of chromium compounds and nitric acid.

Sulfuric acid is preferably used as the source of acidity in the aqueous acidic hydrogen peroxide solution. In addition to water, sulfuric acid, hydrogen peroxide, and the stabilizer composition, the treatment bath may contain other components such as, for example, a fume suppressant to reduce sulfuric acid misting.

The components of the treatment bath and the concentrations of the treatment bath components can and may be varied as needed, depending upon the particular requirements of a cleaning or descaling operation and the nature of the metal surface being treated.

Typical concentrations of the components of the working treatment bath are as follows: 0.1 to 3 weight percent hydrogen peroxide, 3 to 20 weight percent sulfuric acid, 20 to 200 ppm aryl sulfonic acid, and 1 to 20 ppm triazole, with the balance being predominately water.

The treatment bath generally will be maintained and operated at a temperature in the range of from about ambient (room) temperature to about 50° C. Temperatures above 60° C. should be avoided due to accelerated decomposition of the hydrogen peroxide. Higher bath temperatures will generally produce faster metal oxide removal rates. The time during which the treatment bath is contacted with the metal substrate surface to be treated will usually be about 1 to about 5 minutes, depending upon the thickness and character of the scale to be removed and the final surface finish desired. Any suitable means of contacting the treatment bath with the substrate surface, such as immersion (dipping), spraying, or the like. If the treatment bath is sprayed onto the substrate surface, the metal oxide removal rate will normally be increased. Extended contact times will often produce a dull or matte finish.

If organic residues such as oils or greases are present on the substrate surface, it is preferred to clean such residues from the substrate surface using an alkaline cleaner, vapor degreaser, or other suitable method. Such organic residues, if left on the substrate surface, will tend to decompose the hydrogen peroxide in the pickling bath.

If the substrate surface has heavy deposits of cupric oxides (black oxides), pre-treatment with a hot (70–77° C.) 10–20% aqueous solution of sulfuric acid alone is preferred prior to contacting the metal substrate surface with the stabilized acidic aqueous solution of hydrogen peroxide. Concurrent black and red oxide removal using the treatment bath of the present invention can be accomplished using long immersion times and very low hydrogen peroxide levels (e.g., no more than 0.2% by volume hydrogen peroxide).

For cleaning the surfaces of metal alloys containing tin and/or lead, it may be advantageous to include a carboxylic acid, especially a short chain aliphatic monocarboxylic acid such as acetic acid or propionic acid in the aqueous acidic solution of hydrogen peroxide.

Hot substrates can be quench-treated in the aqueous acidic solutions of the present invention provided the solution temperature is maintained below 60° C. using cooling coils or other cooling means. Such quench-treatment allows short dip (contact) times and/or higher metal oxide removal rates as compared to processes where the substrate is at about ambient temperature when contacted with the solution.

The surface treatment process of the present invention may comprise a further step of removing metal species from the solution after the solution has been used for some period of time to remove metal oxides from a metal substrate surface. Although the acidic aqueous solution will continue to remove metal oxide even when saturated with soluble metal species derived from the metal oxide, the cleaning rate will be reduced. The solubilized metal species may be removed by any suitable method. For example, copper (typically present in the solution in the form of copper sulfate) may be removed by simple neutralization (precipitation of copper hydroxide by addition of caustic soda or lime), crystallization of copper sulfate (typically, by cooling the solution and recovering the crystallized copper sulfate by filtration), or by electrolysis. Depending upon the metal removal method selected, it may be possible to recover and recycle the active components of the solution such as hydrogen peroxide and sulfuric acid.

When the stabilizer compositions of the present invention are to be formulated and used in concentrated form, it will frequently be desirable to include other components in the concentrate. For example, solvents and coupling agents may be used to solubilize the aryl sulfonic acid and triazole to provide a homogeneous solution. In addition to water, water-soluble or water-miscible solvents and coupling agents may preferably be used, including, for example, glycols (including glycol oligomers), glycol ethers, alcohols and the like (certain of these substances may also aid in inhibiting hydrogen peroxide decomposition). A base such as an alkali metal hydroxide may also be added for purposes of rendering the stabilizer composition concentrate homogeneous. In addition to the aryl sulfonic acid and triazole, other types of hydrogen peroxide stabilizers and chelating agents may be present such as, for example, phenols, alkyl sulfonic acids, sulfathiazole, phenacetin, quinolines, ureas, amino pyridines, amines, amides, imines, organic acids, and phosphonic acids (including compounds containing two or more phosphonic acid groups per molecule). Typically, a stabilizer concentrate in accordance with the present invention will be prepared using 5 to 30 (preferably, 12 to 20) weight percent aryl sulfonic acid, 0.1 to 10 (preferably, 0.5 to 1.5) weight percent triazole, 0.5 to 6 (preferably, 1 to 5) weight percent base, 20 to 80 (preferably, 30 to 70) weight percent water-miscible or water-soluble solvent/coupling agent, with the balance to 100% being water.

An especially preferred concentrated stabilizer composition is as follows:

| Component | Wt. % |
| --- | --- |
| Phenol Sulfonic Acid (65%) | 25 |
| Tolyltriazole | 1 |
| Water | 17.4 |
| Diethylene Glycol | 50 |
| NaOH (50%) | 6.6 |

Such a concentrated stabilizer composition can suitably, for example, be combined with 50% aqueous hydrogen peroxide to provide a stabilized hydrogen peroxide composition. Typically, about 2 to about 4 parts by weight of the concentrated stabilizer composition are used per 100 parts by weight of the 50% hydrogen peroxide. Working treatment baths may thereafter be prepared using about 6 to about 10 liters sulfuric acid and about 0.5 to about 3.5 liters of the stabilized hydrogen peroxide composition per 100 liters of treatment bath (the balance of the treatment bath being water). The treatment bath will typically contain about 6 to about 10% by volume of sulfuric acid and about 0.5 to about 3.5% by volume of the stabilized hydrogen peroxide composition. About 0.002 to about 0.008% by volume of a fume suppressant such as ANO-FUME-GO may also be present.

What is claimed is:

1. A process for removing metal oxide from a surface of a non-ferrous metal substrate having a metal oxide layer thereon, said process comprising:
   a) contacting said surface having a metal oxide layer thereon with an acidic solution comprised of water, hydrogen peroxide, a mineral acid, an aryl sulfonic acid, and a triazole; and
   b) maintaining said surface in contact with said solution until at least a portion of said metal oxide layer has been removed from said surface;

wherein the aryl sulfonic acid And triazole are present in amounts effective to retard decomposition of the hydrogen peroxide in said solution.

2. The process of claim 1 wherein the aryl sulfonic acid is a hydroxy-aryl sulfonic acid.

3. The process of claim 1 wherein the aryl sulfonic acid is phenol sulfonic acid.

4. The process of claim 1 wherein the non-ferrous metal substrate is comprised of copper.

5. The process of claim 1 wherein the triazole is a benzotriazole.

6. The process of claim 1 wherein the triazole is tolyltriazole.

7. A stabilizer composition concentrate useful for stabilizing an aqueous acidic solution of hydrogen peroxide while using said solution to treat a surface of a non-ferrous metal substrate having a metal oxide layer thereon, said stabilizer composition concentrate comprising:
   a) water;
   b) an aryl sulfonic acid or salt thereof;
   a) a triazole or salt thereof; and
   d) at least one water-soluble or water-miscible solvent or coupling agent
   in the absence of mineral acid.

8. The stabilizer composition concentrate of claim 7 wherein the aryl sulfonic acid is a hydroxy-aryl sulfonic acid.

9. The stabilizer composition concentrate of claim 7 wherein the aryl sulfonic acid is phenol sulfonic acid.

10. The stabilizer composition concentrate of claim 7 wherein the triazole is a benzotriazole.

11. The stabilizer composition concentrate of claim 7 wherein the triazole is tolyltriazole.

12. The stabilizer composition concentrate of claim 7 comprising at least one water-soluble or water-miscible solvent or coupling agent selected from the group consisting of glycols and glycol oligomers.

13. A stabilized hydrogen peroxide composition comprising:
   a) water;
   b) an aryl sulfonic acid or salt thereof;
   c) a triazole or salt thereof; and
   d) 35–60 weight percent hydrogen peroxide.

14. The stabilized hydrogen peroxide composition of claim 13 wherein component (b) is a hydroxy-aryl sulfonic acid or salt thereof.

15. The stabilized hydrogen peroxide composition of claim 13 wherein component (b) is phenol sulfonic acid or salt thereof.

16. The stabilized hydrogen peroxide composition of claim 13 wherein component (c) is a benzotriazole or salt thereof.

17. The stabilized hydrogen peroxide composition of claim 13 wherein component (c) is tolyltriazole or salt thereof.

18. The stabilized hydrogen peroxide composition of claim 13 additionally comprising sulfuric acid.

19. An aqueous acidic solution useful for removing metal oxide from a surface of a non-ferrous metal substrate, said aqueous acidic solution comprising:
   a) water;
   b) hydrogen peroxide;
   c) phenol sulfonic acid;
   d) 1–20 ppm tolyltriazole; and
   e) sulfuric acid.

20. The process of claim 1 wherein the concentration of triazole In said solution is 1–20 ppm.

* * * * *